United States Patent
Takahashi

(10) Patent No.: US 10,295,890 B2
(45) Date of Patent: May 21, 2019

(54) ZOOM LENS AND IMAGE PROJECTION APPARATUS

(71) Applicant: CANON KABUSHIKI KAISHA, Tokyo (JP)

(72) Inventor: Makoto Takahashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/025,252

(22) Filed: Jul. 2, 2018

(65) Prior Publication Data

US 2019/0011815 A1   Jan. 10, 2019

(30) Foreign Application Priority Data

Jul. 6, 2017 (JP) .................................. 2017-132431

(51) Int. Cl.
*G03B 21/14* (2006.01)
*G03B 5/02* (2006.01)

(52) U.S. Cl.
CPC ............. *G03B 21/142* (2013.01); *G03B 5/02* (2013.01); *G03B 2205/0046* (2013.01)

(58) Field of Classification Search
CPC .................. G03B 21/14; G03B 21/142; G03B 2205/0046; G03B 2205/0053; G02B 15/14; G02B 15/16; G02B 15/161; G02B 15/163; G02B 15/167; G02B 15/173; G02B 15/177
See application file for complete search history.

(56) References Cited

U.S. PATENT DOCUMENTS

| | | | |
|---|---|---|---|
| 9,116,331 B2 | 8/2015 | Masui | |
| 9,678,412 B2 | 6/2017 | Imai et al. | |
| 2007/0121218 A1* | 5/2007 | Yamaguchi | G02B 15/177 359/680 |
| 2013/0308105 A1* | 11/2013 | Kubota | G02B 15/177 353/85 |
| 2014/0132790 A1* | 5/2014 | Takahashi | G02B 15/177 348/220.1 |
| 2015/0316755 A1* | 11/2015 | Takemoto | G02B 15/16 359/683 |
| 2015/0346464 A1* | 12/2015 | Imai | G02B 13/22 353/38 |
| 2017/0153430 A1* | 6/2017 | Iijima | G02B 13/22 |

FOREIGN PATENT DOCUMENTS

| JP | 2003241094 A | 8/2003 |
|---|---|---|
| JP | 2017083563 A | 5/2017 |

* cited by examiner

*Primary Examiner* — Sultan Chowdhury
(74) *Attorney, Agent, or Firm* — Rossi, Kimms & McDowell LLP

(57) ABSTRACT

The zoom lens (1) includes an aperture stop (ST1), at least three front side movable lens units (B2 to B4) disposed on an enlargement conjugate side further than the aperture stop and movable for zooming, and a front side fixed lens unit (B1) disposed on the enlargement conjugate side further than the at least three front side movable lens units and fixed for the zooming. The at least three front side movable lens units include two first front side movable lens units (B2 and B3) movable to the enlargement conjugate side for zooming from a wide-angle end to a telephoto end, and a second front side movable lens unit (B4) disposed on the reduction conjugate side further than the first front side movable lens units and movable to the reduction conjugate side for the zooming from the wide-angle end to the telephoto end.

8 Claims, 9 Drawing Sheets

ZOOM LENS AND IMAGE PROJECTION APPARATUS

BACKGROUND OF THE INVENTION

Field of the Invention

The present invention relates to a zoom lens suitable for a projection lens of an image projection apparatus.

Description of the Related Art

Projection lenses for image projection apparatuses (projectors) need a high-resolution performance capable of projecting a higher-definition image and a magnification variation (zooming) function capable of arbitrarily controlling a projection image size.

Japanese Patent Laid-Open No. 2003-241094 discloses a projection lens configured to move five lens units to perform variation of magnification.

However, it is difficult for conventional projection lenses including the one disclosed in Japanese Patent Laid-Open No. 2003-241094 to provide such a high-resolution performance over the entire zoom range from a wide-angle end to a telephoto end.

In other words, their resolution performance significantly changes at the wide-angle end and the telephoto end.

SUMMARY OF THE INVENTION

The present invention provides a zoom lens capable of providing a higher-resolution performance over the entire zoom range and provides an image projection apparatus using the zoom lens.

The present invention provides as an aspect thereof a zoom lens including a stop, at least three front side movable lens units that are disposed on an enlargement conjugate side further than the stop and that are movable for variation of magnification, and a front side fixed lens unit that is disposed on the enlargement conjugate side further than the at least three front side movable lens units and that is fixed for the variation of magnification. The at least three front side movable lens units include two lens movable lens units as first front side movable lens units that are movable to the enlargement conjugate side for variation of magnification from a wide-angle end to a telephoto end, and one movable lens unit as a second front side movable lens unit that is disposed on the reduction conjugate side further than the first front side movable lens units and is movable to the reduction conjugate side for the variation of magnification from the wide-angle end to the telephoto end.

The present invention provides as another aspect thereof an image projection apparatus including the above zoom lens as a projection lens.

Further features of the present invention will become apparent from the following description of exemplary embodiments with reference to the attached drawings.

DESCRIPTION OF THE EMBODIMENTS

Preferred embodiments will be described below with reference to the attached drawings.

First, prior to description of specific embodiments (numerical examples) 1 to 4, with reference to FIG. 1, description will be made of basic matters common to zoom lenses of the embodiments (denoted by 1, 21, 31 and 41 in FIGS. 1, 4, 7 and 10).

Figure 1:
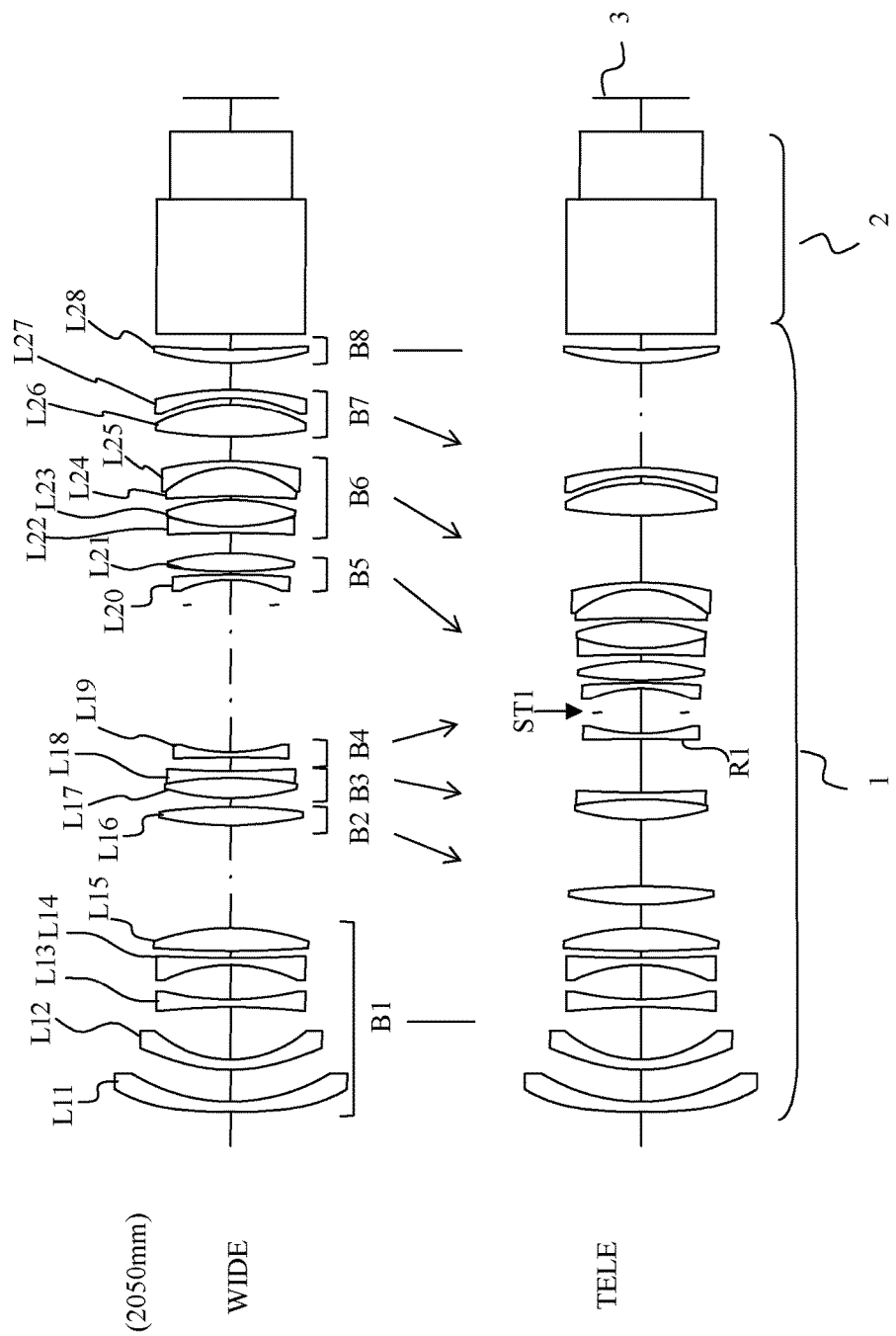
FIG. 1 is a sectional view of a zoom lens (projection distance 2050 mm) that is Embodiment 1 of the present invention.

The zoom lens of each embodiment is used as a projection lens that projects light entering from a reduction conjugate side (light modulation element side) that is the right side in FIG. 1 to an enlargement conjugate side (projection surface side) that is the left side in FIG. 1. A light modulation element 3 illustrated in FIG. 1 modulates light from a light source (not illustrated) depending on an input image signal. The light modulation element 3 is constituted by a liquid crystal panel, a digital micromirror device and others. An optical block 2 introduces the light from the light modulation element 3 to the projection lens. The optical block 2 is constituted by a prism, a filter and others.

The zoom lens of each embodiment includes, in order from the enlargement conjugate side to the reduction conjugate side, a first lens unit B1 (denoted by B21, B31 and B41 in FIGS. 4, 7 and 10) to an eighth or seventh lens unit as a final lens unit (denoted by B8, B27, B38 and B48 in FIGS. 1, 4, 7 and 10). The zoom lens of each embodiment moves multiple movable lens units (second to seventh lens units B2 to B7 in FIG. 1) in an optical axis direction of the zoom lens such that distances between mutually adjacent lens units are changed to perform variation of magnification from a wide-angle end to a telephoto end.

The distance between the mutually adjacent lens units is, for example, a distance between the first and second lens units B1 and B2, and a distance between the third and fourth lens units B3 and B4. That is, the distance between the mutually adjacent lens units, which changes with the variation of magnification, is a boundary between these lens units. The change of the distance between the mutually adjacent lens units also includes a change of a distance between lens units fixed and moved for the variation of magnification, such as that between the first and second lens units B1 and B2. Each lens unit (or each lens group) in each embodiment may include multiple lenses or only one lens.

The zoom lens of each embodiment includes an aperture stop (or a stop) ST1 (ST2, ST3 and ST4 in FIGS. 4, 7 and 10) disposed between the fourth lens unit B4 (B24, B34 and B44 in the same figures) and the fifth lens unit B5 (B25, B35 and B45 in the same figures). The zoom lens of each embodiment further includes at least three front side movable lens units B2 to B4 (B22 to B24, B32 to B34 and B41 to B44 in FIGS. 4, 7 and 10) that are disposed on the enlargement conjugate side (left side in the drawing) further than the aperture stop ST1 and are movable for the variation of magnification.

Although the number of the front side movable lens units is three or four in each embodiment, the number thereof may be more than four.

The at least three front side movable lens units include first front side movable lens units B2 and B3 (B22 and B23, B32 and B33, and B42 and B43 in FIGS. 4, 7 and 10) that are movable to the enlargement conjugate side for the variation of magnification from the wide-angle end to the telephoto end. The at least three front side movable lens units further include a second front side movable lens unit B4 (B24, B34 and B44 in FIGS. 4, 7 and 10) that is disposed on the reduction conjugate side further than the first front side movable lens units B2 and B3 and is movable to the reduction conjugate side for the variation of magnification from the wide-angle end to the telephoto end. Although the zoom lens of each embodiment includes two first front side movable lens units, it is enough that the zoom lens includes at least one first front side movable lens unit. On the other hand, although the zoom lens of each embodiment includes one second front side movable lens unit, the zoom lens may include two or more second front side movable lens units.

The zoom lenses of Embodiments 1 to 3 (except Embodiment 4) each include a front side fixed lens unit B1 (B21 and B31 in FIGS. 4 and 7) that is disposed on the enlargement conjugate side further than the front side movable lens units B2 to B4 and is fixed (unmoved) for the variation of magnification. The front side fixed lens unit is a first lens unit disposed at a most-enlargement conjugate side position in Embodiments 1 to 3.

Furthermore, the zoom lens of each embodiment includes at least two rear side movable lens units B5 to B7 (B25 and B26, B35 to B37, and B45 to B47 in FIGS. 4, 7, and 10) that are disposed on the reduction conjugate side further than the aperture stop ST1 and are movable for the variation of magnification.

Moreover, at least one of the at least three front side movable lens units includes at least one cemented lens (constituted by lenses L17 and L18 in FIG. 1). This makes it possible to reduce a variation in chromatic aberration of magnification for the variation of magnification.

The zoom lens of each embodiment having the above-described configuration enables providing a high-definition performance (that is, reducing a variation in resolution performance) over the entire zoom range, thereby providing a good optical performance over the entire angle of field.

Next, description will be made of conditions that the zoom lens of each embodiment is desirable to satisfy.

The zoom lens of each embodiment satisfies the following condition expressed by expression (1) to provide a high-resolution performance over the entire zoom range from the wide-angle end to the telephoto end.

$$-0.6 \leq \varphi b/\varphi w < 0 \tag{1}$$

In expression (1), $\varphi w$ represents a refractive power of the entire zoom lens at the wide-angle end, and $\varphi b$ represents a refractive power of the second front side movable lens unit that is movable to the reduction conjugate side for the variation of magnification from the wide-angle end to the telephoto end. A higher value of $\varphi b/\varphi w$ than the upper limit of expression (1) and a lower value of $\varphi b/\varphi w$ than the lower limit thereof make it impossible to reduce a variation in field curvature for the variation of magnification.

It is more desirable that the zoom lens of each embodiment satisfy the following condition expressed by expression (1)' having a narrower range than that of expression (1).

$$-0.4 \leq \varphi b/\varphi w \leq -0.2 \tag{1)'}$$

The projector needs a space in which an optical element such as a prism that combines multiple color lights modulated by multiple light modulation elements (such as liquid crystal elements) between these light modulation elements and the projection lens. Therefore, it is necessary that the projection lens has a back focus of a sufficient length. Thus, it is desirable that the zoom lens satisfy the following condition expressed by expression (2).

$$-0.7 \leq \varphi 1/\varphi w \leq -0.1 \tag{2}$$

In expression (2), $\varphi 1$ represents a refractive power of the first lens unit (front side fixed lens unit) B1. Satisfying this condition enables the zoom lens to have a back focus of a sufficient length over the entire zoom length. It is more desirable that the zoom lens of each embodiment satisfy the following condition expressed by expression (2)' having a narrower range than that of expression (2).

$$-0.6 \leq \varphi 1/\varphi w \leq -0.2 \tag{2)'}$$

Furthermore, in the zoom lens of each embodiment, a negative refractive power of the second front side movable lens unit B4 satisfying the following condition expressed by (3) enables providing a good optical performance over the entire zoom range.

$$-0.2 \leq \varphi br1/\varphi w \leq 0.3 \tag{3}$$

In expression (3), $\varphi br1$ represents a refractive power of an enlargement conjugate side lens surface R1 of a most-reduction conjugate side lens of the second front side movable lens unit B4.

In each embodiment, the second front side movable lens unit B4 is constituted by one (single) lens in order to reduce its weight and simplify its configuration, and the lens surface R1 is an enlargement conjugate side lens surface of that lens. The second front side movable lens unit may include two or more lenses. In this case, the lens surface R1 is an enlargement conjugate side lens surface of a most-reduction conjugate side lens of the two or more lenses.

A value of $\varphi br1$ making a value of $\varphi br1/\varphi w$ higher than the upper limit of expression (3) excessively corrects distortion aberration of the zoom lens. On the other hand, a value of $\varphi br1$ making the value of $\varphi br1/\varphi w$ lower than the lower limit of expression (3) insufficiently corrects the distortion aberration. That is, these values of $\varphi br1$ make it impossible to provide a good optical performance.

It is more desirable that the zoom lens of each embodiment satisfy the following condition expressed by expression (3)' having a narrower range than that of expression (3).

$$-0.1 \leq \varphi br1/\varphi w \leq 0 \tag{3)'}$$

Satisfying the above-described conditions of expressions (1) to (3) enables providing a zoom lens having a high-resolution performance over the entire zoom range and a telecentric zoom lens having a good optical performance over the entire angle of field.

Although in each embodiment the second lens unit B2 is also constituted by one lens in order to reduce its weight and simplify its configuration, the second lens unit B2 may be constituted by two or more lenses.

Although the zoom lens of each embodiment includes the aperture stop as a physical aperture stop, such a physical aperture stop is not necessarily needed to be provided. When the physical aperture stop is not provided, the position of the aperture stop may be defined as a position at which off-axis principal rays intersect with an optical axis of the zoom lens. Even when the physical aperture stop is provided, this physical aperture stop is not necessarily to be an aperture stop device and may be a member such as a barrel member housing the zoom lens.

Embodiment 1

Description will be made of Embodiment 1 (Numerical example 1). FIG. 1 is a sectional view of a projection lens (whose projection distance 2050 mm) 60 using the zoom lens of Embodiment 1. The zoom lens 1 includes the following first to eighth lens units B1 to B8 disposed in order from the enlargement conjugate side to the reduction conjugate side.

The first lens unit B1 has a negative refractive power and is fixed for the variation of magnification. The second lens unit B2 has a positive refractive power and is moved for the variation of magnification. The third lens unit B3 has a positive refractive power and is moved for the variation of magnification. The fourth lens unit B4 has a negative refractive power and is moved for the variation of magnification. The fifth lens unit B5 has a positive refractive power and is moved for the variation of magnification. The sixth lens unit B6 has a positive refractive power and is moved for the variation of magnification. The seventh lens unit B7 has a positive refractive power and is moved for the variation of magnification. The eighth lens unit B8 has a positive refractive power and is fixed for the variation of magnification.

The aperture stop ST1 is disposed on the enlargement conjugate side further than the fifth lens unit B5 and is moved for the variation of magnification together with the fifth lens unit B5.

The first lens unit B1 is constituted by five lenses L11 to L15 that are negative, negative, negative, negative and positive lenses disposed in order from the enlargement conjugate side. The second lens unit B2 is constituted by one positive lens L16. The third lens unit B3 is constituted by two lenses L17 and L18 that are positive and negative lenses disposed in order from the enlargement conjugate side. The fourth lens unit B4 is constituted by one negative lens L19. The fifth lens unit B5 is constituted by two lenses L20 and L21 that are negative and positive lenses disposed in order from the enlargement conjugate side. The sixth lens unit B6 is constituted by four lenses L22 to L25 that are negative, positive, positive and negative lenses disposed in order from the enlargement conjugate side. The seventh lens unit B7 is constituted by two lenses L26 and L27 that are positive and negative lenses disposed in order from the enlargement conjugate side. The eighth lens unit B8 is constituted by one positive lens L28.

The zoom lens 1 of this embodiment satisfies the above-described conditions of expressions (1) to (3). The values of expressions (1) to (3) are shown in Table 1(C).

Figure 13:
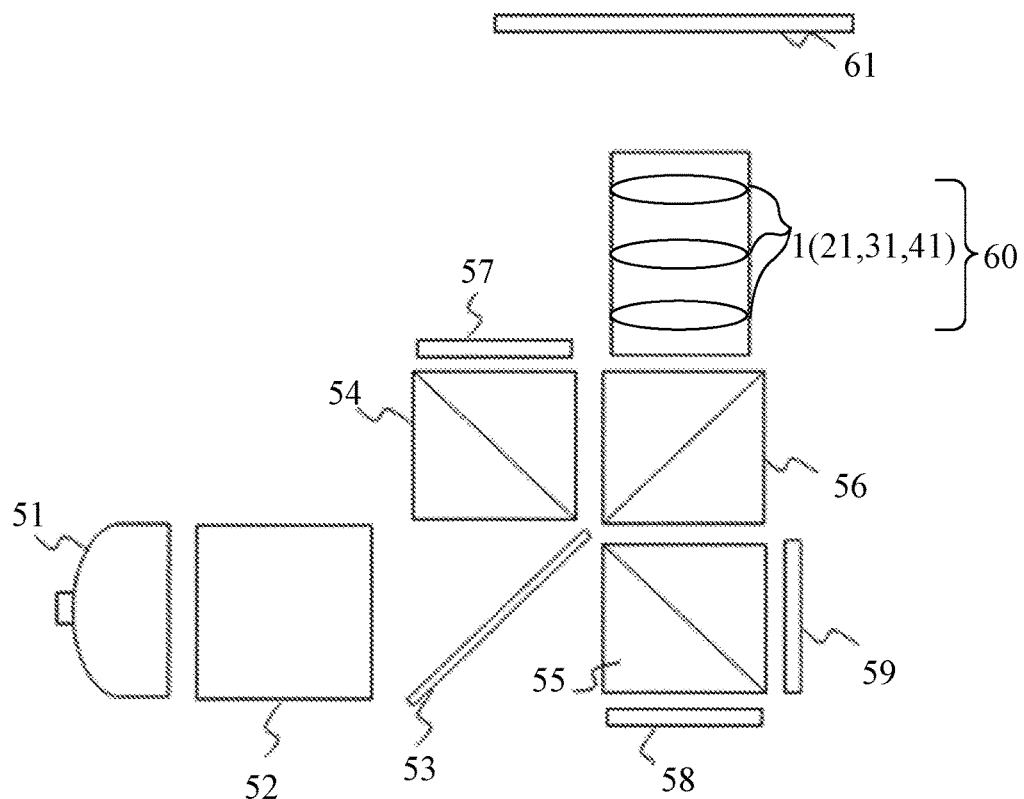
FIG. 13 is a sectional view of a projector using the zoom lens of any one of Embodiments 1 to 4.

FIG. 13 illustrates a configuration of a liquid crystal projector using the projection lens of this embodiment (or of the other embodiments described later).

Light as white non-polarized light emitted from a light source 51 is converted by an illumination optical system 52 into linearly-polarized light having a specific polarization direction. The white linearly-polarized light subjected to optical actions of the illumination optical system 52 illuminates evenly each of three liquid crystal elements 57, 58 and 59. The white linearly-polarized light exiting from the illumination optical system 52 is separated by a dichroic mirror 53 and a first polarization beam splitter 55 into a red (R) light, a green (G) light and a blue (B) light. The R light, the G light and the B light are respectively introduced to the liquid crystal elements 57, 58 and 59 for R, G and B. The R light, the G light and the B light respectively modulated by the liquid crystal elements 57, 58 and 59 are combined by a second polarization beam splitter 54 and a color combining prism 56 to be introduced to the projection lens 60. The combined light is projected through the projection lens 60 onto a screen 61. The projection lens 60 is the zoom lens 1 described in this embodiment (or any one of the zoom lenses 21, 31 and 41 described later in the other embodiments) held by a lens barrel 60a.

The screen 61 may have a planar surface or a curved surface such as a concave surface and a convex surface.

Figure 2:
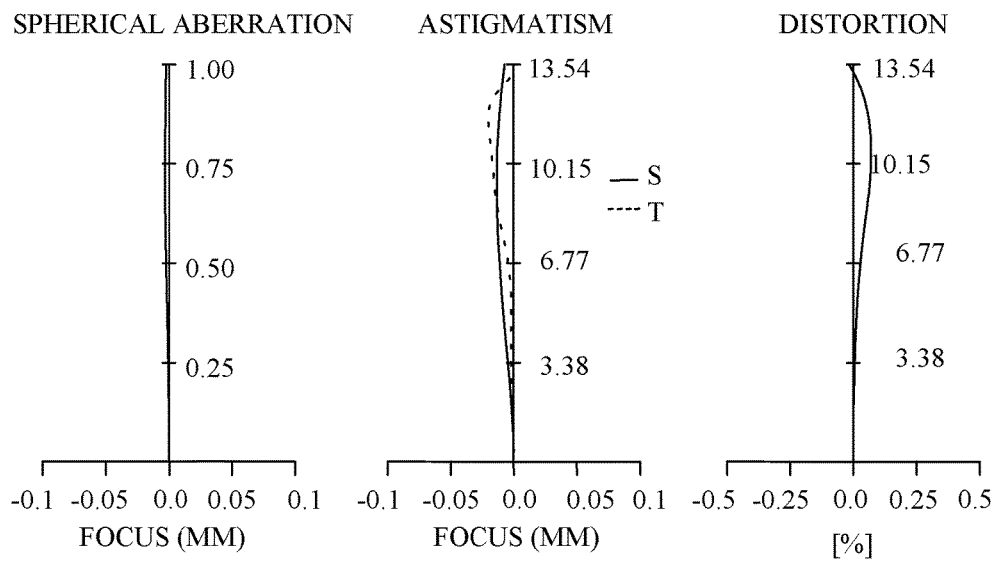
FIG. 2 illustrates aberration diagrams of the zoom lens of Embodiment 1 at its wide-angle end.
Figure 3:
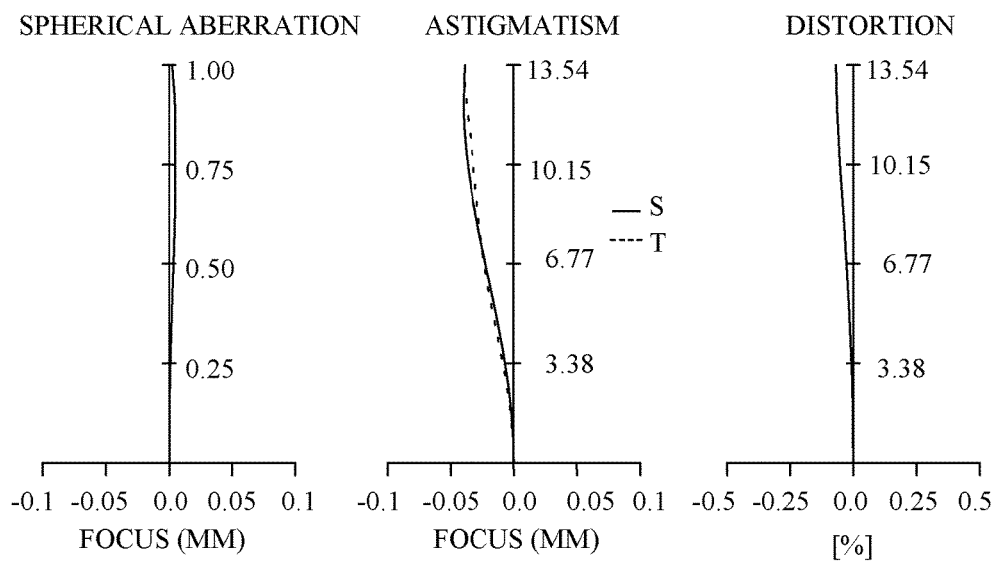
FIG. 3 illustrates aberration diagrams of the zoom lens of Embodiment 1 at its telephoto end.

FIG. 2 and FIG. 3 respectively illustrate spherical aberrations (for a d-line), astigmatisms (S indicates a sagittal plane, and T indicates a tangential plane) and distortions (for the d-line) that are longitudinal aberrations of the projection lens 60 (whose projection distance is 2050 mm) of Numerical example 1 at the wide-angle end and the telephoto end.

Embodiment 2

Figure 4:
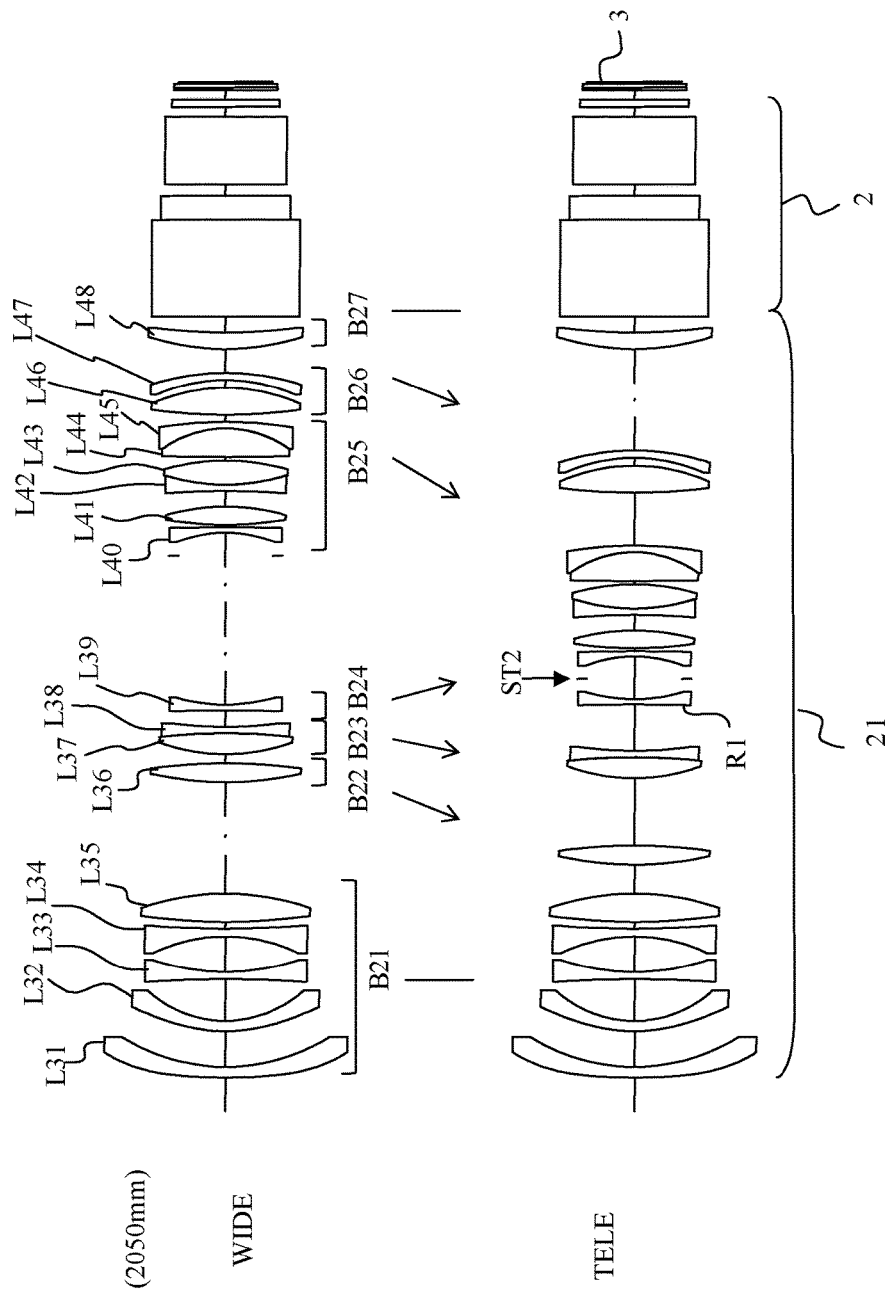
FIG. 4 is a sectional view of a zoom lens (projection distance 2050 mm) that is Embodiment 2 of the present invention.

FIG. 4 is a sectional view of a projection lens (whose projection distance 2050 mm) using the zoom lens 21 of Embodiment 2 (Numerical example 2).

The zoom lens 21 includes the following first to seventh lens units B21 to B27 disposed in order from the enlargement conjugate side to the reduction conjugate side. This embodiment includes two rear side movable lens units whose number is smaller than that of Embodiment 1.

The first lens unit B21 has a negative refractive power and is fixed for the variation of magnification. The second lens unit B22 has a positive refractive power and is moved for the variation of magnification. The third lens unit B23 has a positive refractive power and is moved for the variation of magnification. The fourth lens unit B24 has a negative refractive power and is moved for the variation of magnification. The fifth lens unit B25 has a positive refractive power and is moved for the variation of magnification. The sixth lens unit B26 has a positive refractive power and is moved for the variation of magnification. The seventh lens unit B27 has a positive refractive power and is fixed for the variation of magnification. This embodiment has a configuration corresponding to a case where the fifth and sixth lens units B5 and B6 in Embodiment 1 are integrally moved as the fifth lens unit B25.

The aperture stop ST2 is disposed on the enlargement conjugate side further than the fifth lens unit B25 and is moved for the variation of magnification together with the fifth lens unit B25. The aperture stop ST2 and the fifth lens unit B25 may be moved independently from each other.

The first lens unit B21 is constituted by five lenses L31 to L35 that are negative, negative, negative, negative and positive lenses disposed in order from the enlargement conjugate side. The second lens unit B22 is constituted by one positive lens L36. The third lens unit B23 is constituted by two lenses L37 and L38 that are positive and negative lenses disposed in order from the enlargement conjugate side. The fourth lens unit B24 is constituted by one negative lens L39. The fifth lens unit B25 is constituted by six lenses L40 to L45 that are negative, positive, negative, positive, positive and negative lenses disposed in order from the enlargement conjugate side. The sixth lens unit B26 is constituted by two lenses L46 and L47 that are positive and negative lenses disposed in order from the enlargement conjugate side. The seventh lens unit B27 is constituted by one positive lens L48.

The zoom lens 21 of this embodiment satisfies the above-described conditions of expressions (1) to (3). The values of expressions (1) to (3) are shown in Table 2(C).

Figure 5:
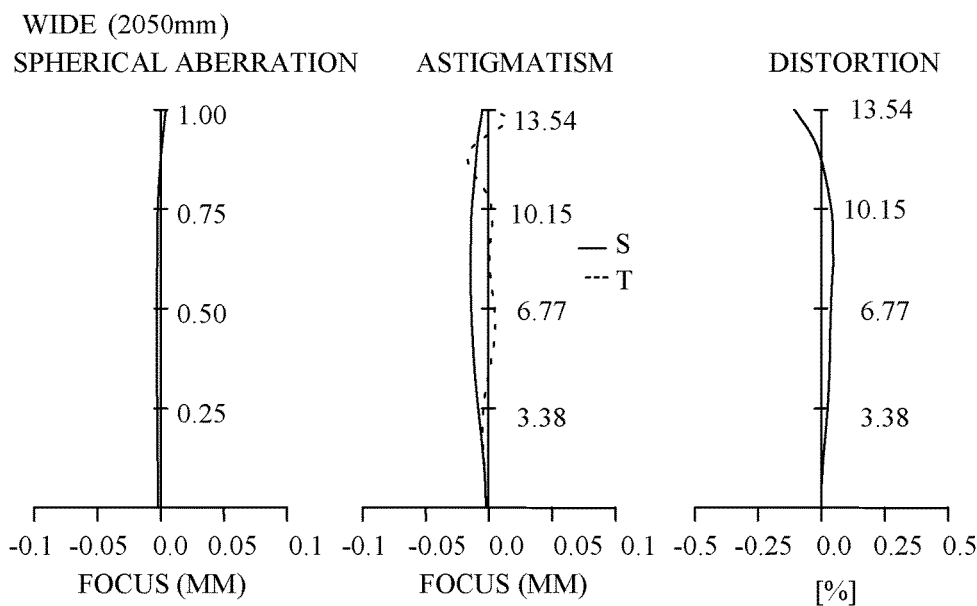
FIG. 5 illustrates aberration diagrams of the zoom lens of Embodiment 2 at its wide-angle end.
Figure 6:
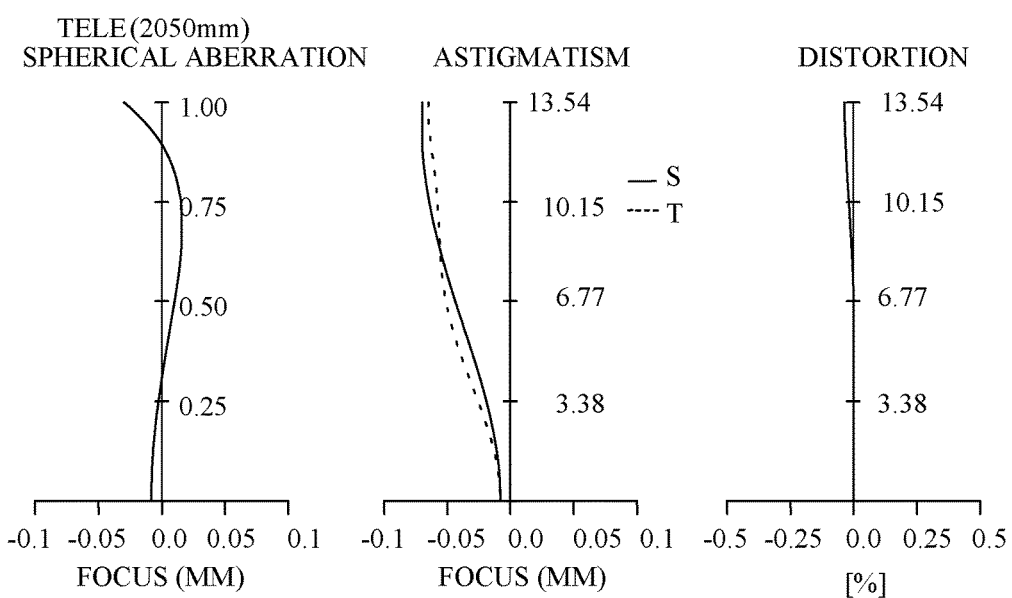
FIG. 6 illustrates aberration diagrams of the zoom lens of Embodiment 2 at its telephoto end.

FIG. 5 and FIG. 6 respectively illustrate spherical aberrations (for the d-line), astigmatisms (S indicates the sagittal plane, and T indicates the tangential plane) and distortions (for the d-line) that are longitudinal aberrations of the projection lens (whose projection distance is 2050 mm) of Numerical example 2 at the wide-angle end and the telephoto end.

Embodiment 3

Figure 7:
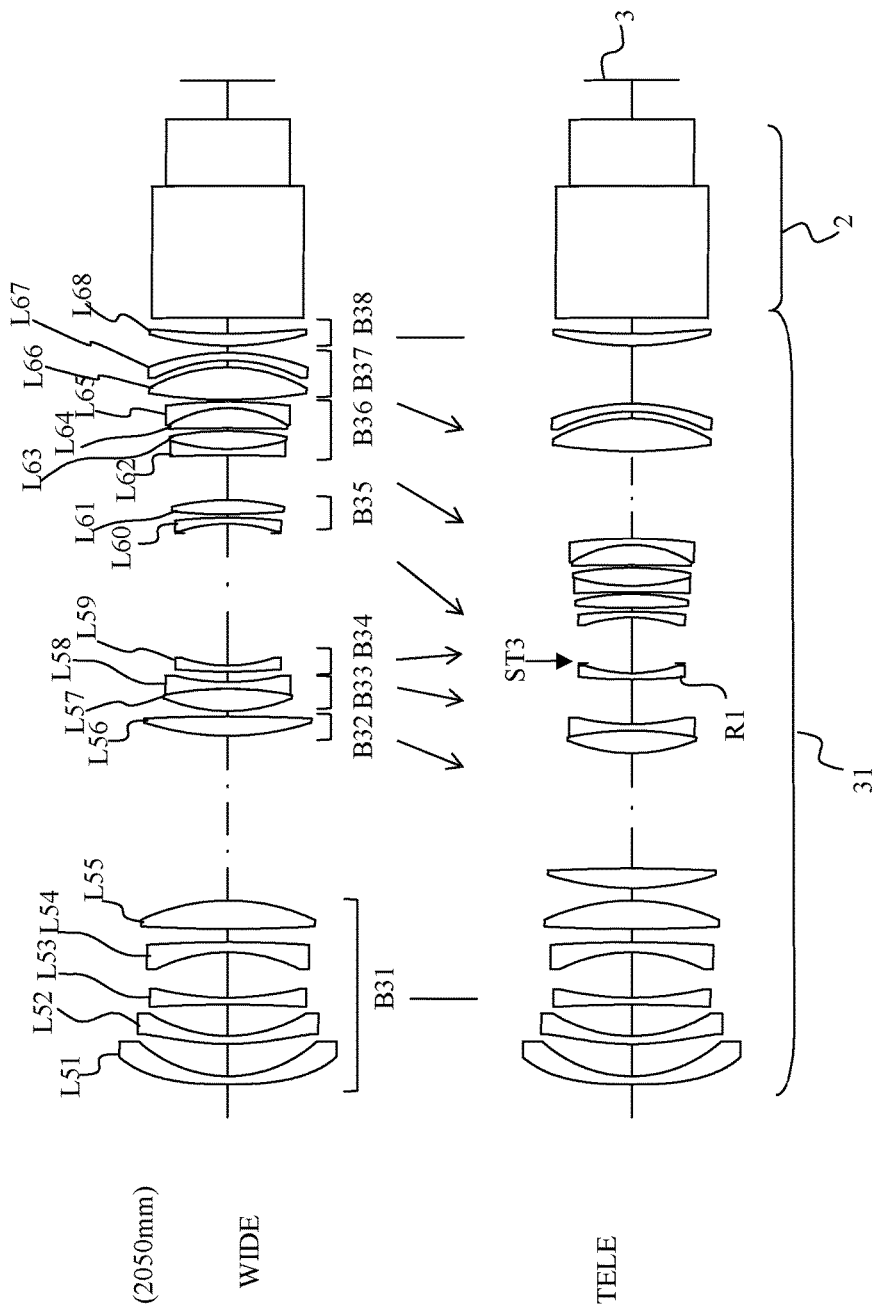
FIG. 7 is a sectional view of a zoom lens (projection distance 2050 mm) that is Embodiment 3 of the present invention.

FIG. 7 is a sectional view of a projection lens (whose projection distance 2050 mm) using the zoom lens 31 of Embodiment 3 (Numerical example 3). The zoom lens 31 includes the following first to eighth lens units B31 to B38 disposed in order from the enlargement conjugate side to the reduction conjugate side.

In this embodiment, the aperture stop ST3 is moved independently from the other movable lens units.

The first lens unit B31 has a negative refractive power and is fixed for the variation of magnification. The second lens unit B32 has a positive refractive power and is moved for the variation of magnification. The third lens unit B33 has a positive refractive power and is moved for the variation of magnification. The fourth lens unit B34 has a negative refractive power and is moved for the variation of magnification. The fifth lens unit B35 has a positive refractive power and is moved for the variation of magnification. The sixth lens unit B36 has a positive refractive power and is moved for the variation of magnification. The seventh lens unit B37 has a positive refractive power and is moved for the variation of magnification. The eighth lens unit B38 has a positive refractive power and is fixed for the variation of magnification.

The aperture stop ST3 is moved for the variation of magnification between the fourth lens unit B34 and the fifth lens unit B35 in the same direction as that of the fifth lens unit B35 by a movement amount different from that of the fifth lens unit B35.

The first lens unit B31 is constituted by five lenses L51 to L55 that are negative, negative, negative, negative and positive lenses disposed in order from the enlargement conjugate side. The second lens unit B32 is constituted by one positive lens L56. The third lens unit B33 is constituted by two lenses L57 and L58 that are positive and negative lenses disposed in order from the enlargement conjugate side. The fourth lens unit B34 is constituted by one negative lens L59. The fifth lens unit B35 is constituted by two lenses L60 and L61 that are negative and positive lenses disposed in order from the enlargement conjugate side. The sixth lens unit B36 is constituted by four lenses L62 to L65 that are negative, positive, positive and negative lenses disposed in order from the enlargement conjugate side. The seventh lens unit B37 is constituted by two lenses L66 and L67 that are positive and negative lenses disposed in order from the enlargement conjugate side. The eighth lens unit B38 is constituted by one positive lens L68.

The zoom lens 31 of this embodiment satisfies the above-described conditions of expressions (1) to (3). The values of expressions (1) to (3) are shown in Table 3(C).

Figure 8:
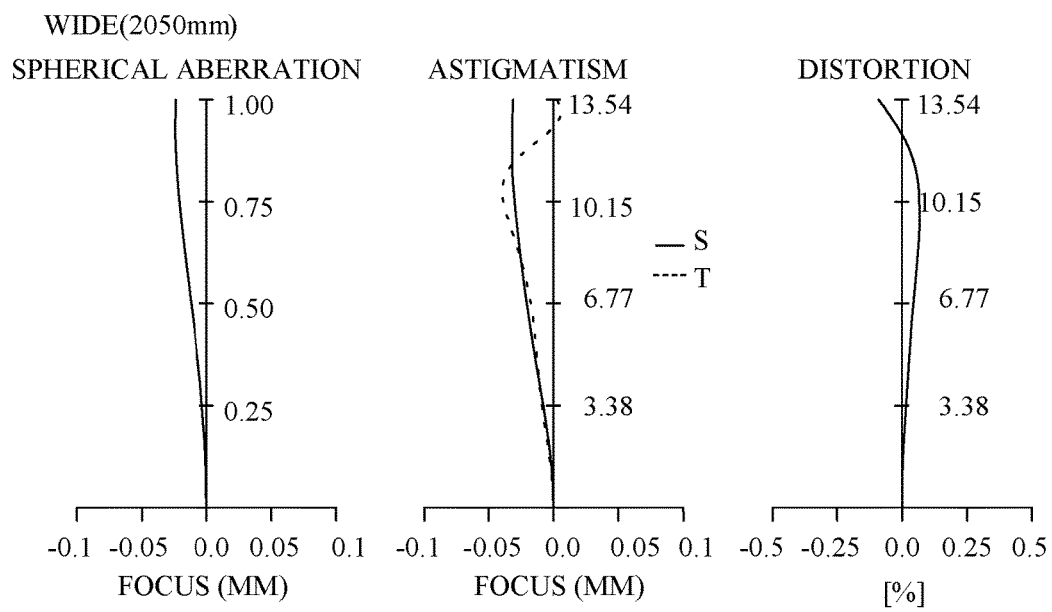
FIG. 8 illustrates aberration diagrams of the zoom lens of Embodiment 3 at its wide-angle end.
Figure 9:
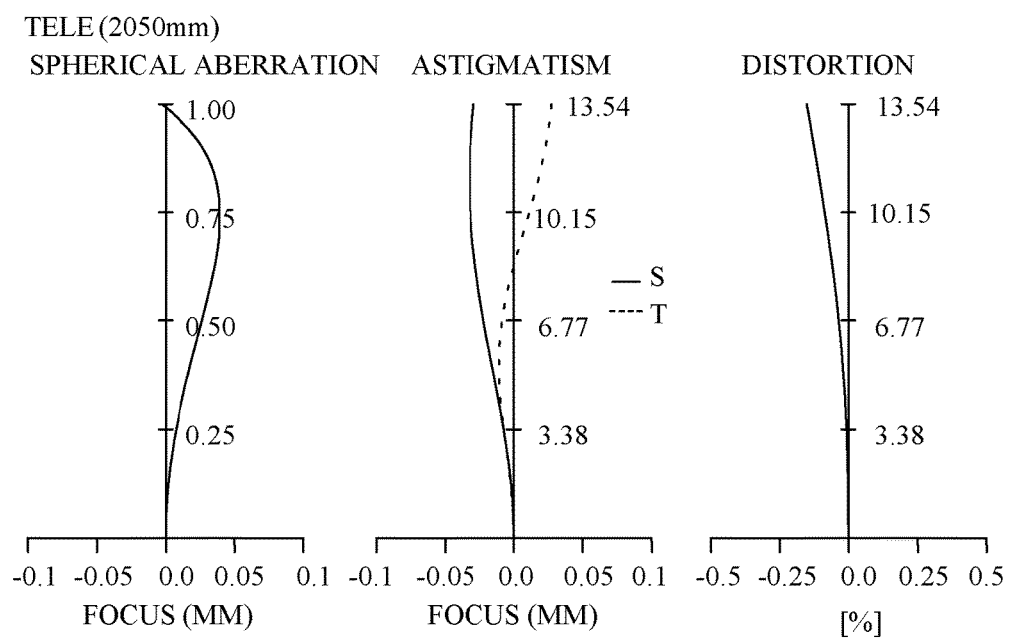
FIG. 9 illustrates aberration diagrams of the zoom lens of Embodiment 3 at its telephoto end.

FIG. 8 and FIG. 9 respectively illustrate spherical aberrations (for the d-line), astigmatisms (S indicates the sagittal plane, and T indicates the tangential plane) and distortions (for the d-line) that are longitudinal aberrations of the projection lens (whose projection distance is 2050 mm) of Numerical example 3 at the wide-angle end and the telephoto end.

Embodiment 4

Figure 10:
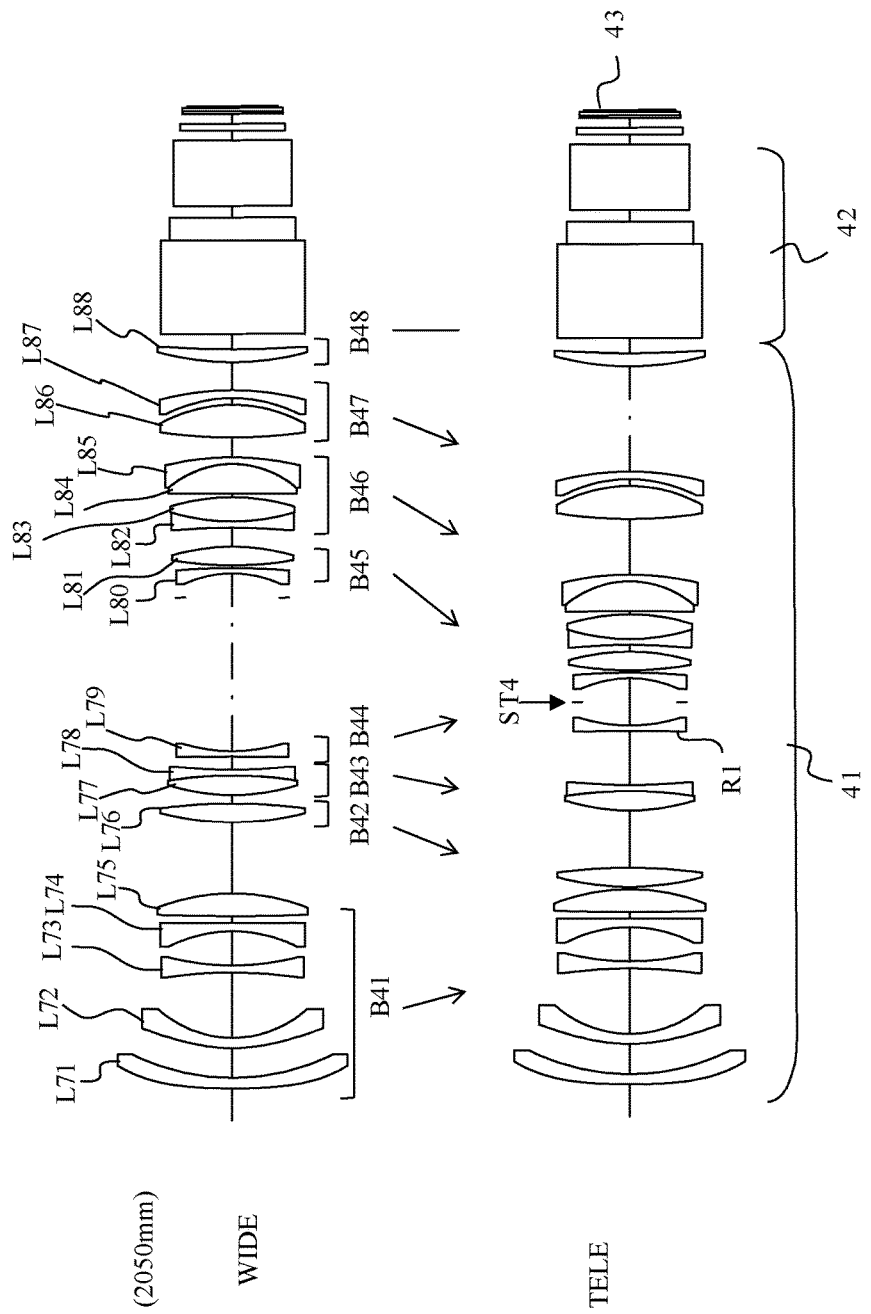
FIG. 10 is a sectional view of a zoom lens (projection distance 2050 mm) that is Embodiment 4 of the present invention.

FIG. 10 is a sectional view of a projection lens (whose projection distance 2050 mm) using the zoom lens 41 of Embodiment 4 (Numerical example 4). The zoom lens 41 includes the following first to eighth lens units B41 to B48 disposed in order from the enlargement conjugate side to the reduction conjugate side. In this embodiment, the first to fourth lens units B41 to B44 that are the front side movable lens units are included on the enlargement conjugate side further than the aperture stop ST4.

The first lens unit B41 has a negative refractive power and is moved for the variation of magnification. The second lens unit B42 has a positive refractive power and is moved for the variation of magnification. The third lens unit B43 has a positive refractive power and is moved for the variation of magnification. The fourth lens unit B44 has a negative refractive power and is moved for the variation of magnification. The fifth lens unit B45 has a positive refractive power and is moved for the variation of magnification. The sixth lens unit B46 has a positive refractive power and is moved for the variation of magnification. The seventh lens unit B47 has a positive refractive power and is moved for the variation of magnification. The eighth lens unit B48 has a positive refractive power and is fixed for the variation of magnification.

The aperture stop ST4 is disposed on the enlargement conjugate side further than the fifth lens unit B45 and is moved for the variation of magnification together with the fifth lens unit B45.

The first lens unit B41 is constituted by five lenses L71 to L75 that are negative, negative, negative, negative and positive lenses disposed in order from the enlargement conjugate side. The second lens unit B42 is constituted by one positive lens L76. The third lens unit B43 is constituted by two lenses L77 and L78 that are positive and negative lenses disposed in order from the enlargement conjugate side. The fourth lens unit B44 is constituted by one negative lens L79. The fifth lens unit B45 is constituted by two lenses L80 and L81 that are negative and positive lenses disposed in order from the enlargement conjugate side. The sixth lens unit B46 is constituted by four lenses L82 to L85 that are negative, positive, positive and negative lenses disposed in order from the enlargement conjugate side. The seventh lens unit B47 is constituted by two lenses L86 and L87 that are positive and negative lenses disposed in order from the enlargement conjugate side. The eighth lens unit B48 is constituted by one positive lens L88.

The zoom lens 41 of this embodiment satisfies the above-described conditions of expressions (1) to (3). The values of expressions (1) to (3) are shown in Table 4(C).

Figure 11:
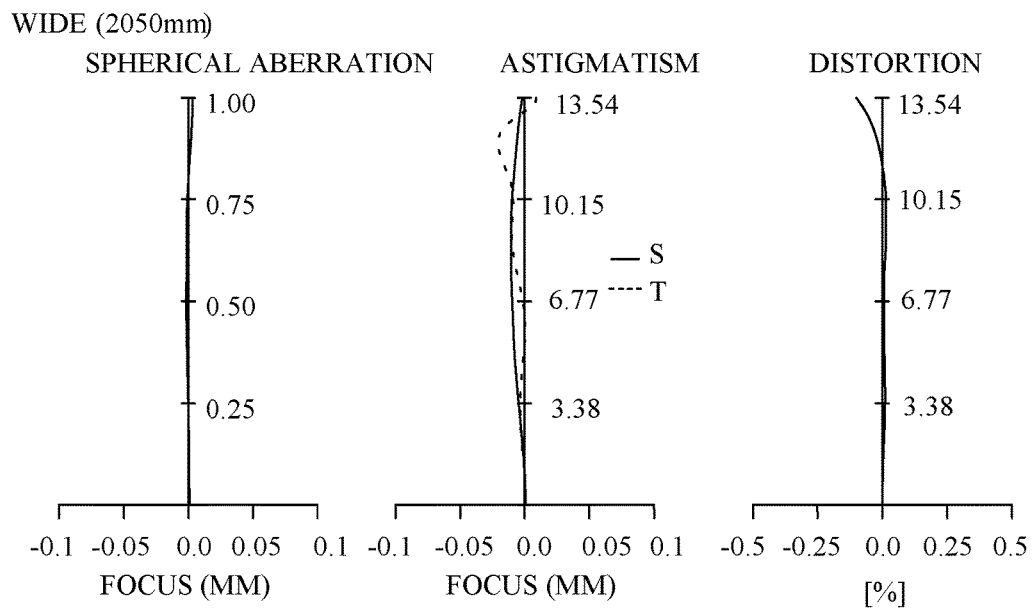
FIG. 11 illustrates aberration diagrams of the zoom lens of Embodiment 4 at its wide-angle end.
Figure 12:
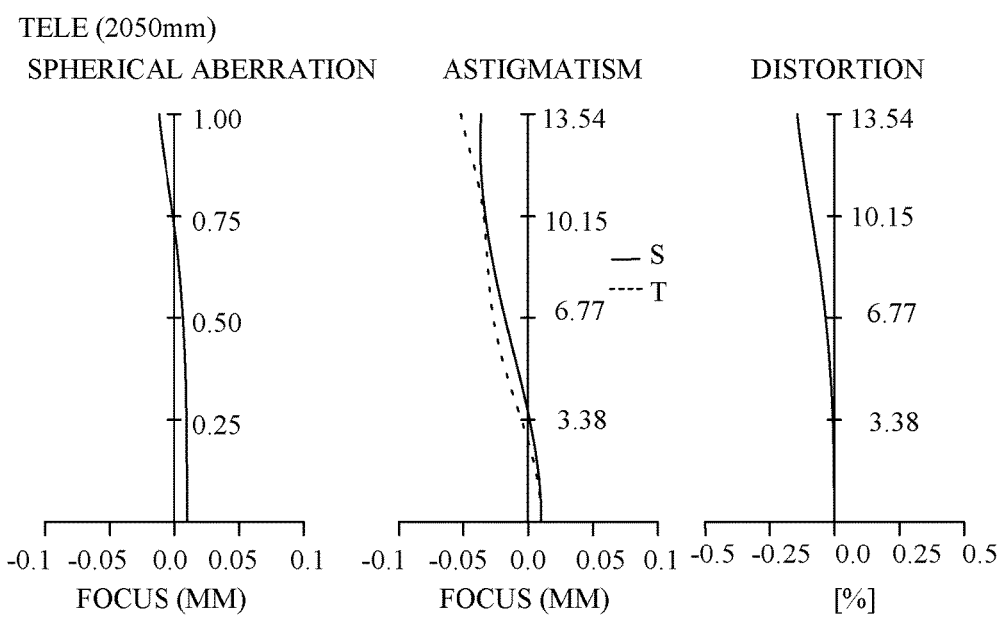
FIG. 12 illustrates aberration diagrams of the zoom lens of Embodiment 4 at its telephoto end.

FIG. 11 and FIG. 12 respectively illustrate spherical aberrations (for the d-line), astigmatisms (S indicates the sagittal plane, and T indicates the tangential plane) and distortions (for the d-line) that are longitudinal aberrations of the projection lens (whose projection distance is 2050 mm) of Numerical example 4 at the wide-angle end and the telephoto end In the following Tables 1 to 4, (A) shows a lens configuration, f represents a focal length, and F represents an aperture ratio.

Furthermore, ri represents a curvature radius (mm) of an i-th surface counted from the enlargement conjugate side, di represents a distance (mm) between the i-th surface and a (i+1)-th surface, ni and vi respectively represent a refractive index and abbe number of an i-th optical member counted from the enlargement conjugate side for the d-line, and ST represents a position of the aperture stop.

A surface to which "*" is added on its left side has an aspheric surface expressed by the following function. In the following Tables 1 to 4, (B) shows aspheric coefficients A to G. Moreover, y represents a coordinate in a lens radial direction, z represents a coordinate in the optical axis direction, k represents a conic coefficient, and "e-X" represents "$\times 10^{-X}$".

$$z(y)=(y^2/ri)/\{1+[1-(1+k)(y^2/ri^2)]^{1/2}\}+Ay^4+By^6+Cy^8+Dy^{10}+Ey^{12}+Fy^{14}+Gy^{16}$$

TABLE 1

(Numerical example 1)

(A) lens configuration

| | Wide | Tele |
|---|---|---|
| f | 22.75 | 39.94 |
| F | 2.60 | 2.97 |
| Field angle | 30.7 | 18.7 |
| Total lens length | 220.0 | |
| BF | 72.6 | |

Zoom ratio 1.76

| | | | |
|---|---|---|---|
| * r1 = 269.66 | d1 = 3.00 | n1 = 1.516 | v1 = 64.1 |
| r2 = 53.82 | d2 = 9.10 | | |
| * r3 = 46.93 | d3 = 3.00 | n2 = 1.773 | v2 = 49.6 |
| r4 = 32.60 | d4 = 15.17 | | |
| r5 = −168.33 | d5 = 2.10 | n3 = 1.497 | v3 = 81.5 |
| r6 = 82.31 | d6 = 10.17 | | |
| r7 = −43.60 | d7 = 2.00 | n4 = 1.497 | v4 = 81.5 |
| r8 = 409.66 | d8 = 2.00 | | |
| r9 = 283.69 | d9 = 6.60 | n5 = 1.694 | v5 = 50.8 |
| r10 = −65.53 | d10 = variable | | |
| r11 = 90.91 | d11 = 5.30 | n6 = 1.678 | v6 = 55.3 |
| r12 = −147.87 | d12 = variable | | |
| r13 = 65.53 | d13 = 5.90 | n7 = 1.717 | v7 = 29.5 |
| r14 = −100.81 | d14 = 1.90 | n8 = 1.805 | v8 = 25.5 |
| r15 = 251.33 | d15 = variable | | |
| r16 = −656.56 | d16 = 1.60 | n9 = 1.717 | v9 = 47.9 |
| r17 = 50.86 | d17 = variable | | |
| ST r18 = ∞ | d18 = 7.20 | | |
| r19 = −34.87 | d19 = 1.60 | n10 = 1.606 | v10 = 43.7 |
| r20 = −193.81 | d20 = 0.75 | | |
| r21 = 111.02 | d21 = 5.40 | n11 = 1.808 | v11 = 22.8 |
| r22 = −65.81 | d22 = variable | | |
| r23 = −339.98 | d23 = 1.80 | n12 = 1.855 | v12 = 24.8 |
| r24 = 56.76 | d24 = 7.70 | n13 = 1.516 | v13 = 64.1 |
| r25 = −56.76 | d25 = 1.03 | | |
| r26 = −232.28 | d26 = 8.20 | n14 = 1.607 | v14 = 56.8 |
| r27 = −29.11 | d27 = 2.00 | n15 = 1.855 | v15 = 24.8 |
| r28 = −83.70 | d28 = variable | | |
| r29 = 128.06 | d29 = 9.30 | n16 = 1.439 | v16 = 94.7 |
| r30 = −45.05 | d30 = 2.00 | | |
| r31 = −44.43 | d31 = 2.40 | n17 = 1.673 | v17 = 38.2 |

TABLE 1-continued (Numerical example 1)

| | | | |
|---|---|---|---|
| r32 = −85.14 | d32 = variable | | |
| r33 = 78.89 | d33 = 3.80 | n18 = 1.946 | v18 = 18.0 |
| r34 = 221.59 | d34 = 4.50 | | |
| r35 = ∞ | d35 = 38.70 | n19 = 1.516 | v19 = 64.0 |
| r36 = ∞ | 36 = 19.50 | n20 = 1.841 | v20 = 25.0 |
| r37 = ∞ | d37 = 9.87 | | |

Zoom (2050 mm)

| Unit distance | Wide | Tele |
|---|---|---|
| d10 | 29.53 | 6.71 |
| d12 | 2.51 | 19.10 |
| d15 | 3.93 | 15.47 |
| d17 | 42.49 | 5.96 |
| d22 | 5.78 | 2.00 |
| d28 | 6.94 | 19.27 |
| d32 | 7.76 | 30.43 |

(B) Aspheric coefficients

| | K | A | B | C |
|---|---|---|---|---|
| r1 | 0 | 5.59393E−06 | – | 5.58718E−12 |
| r3 | 0 | −3.84698E−06 | 1.10923E−09 | −6.65578E−13 |

| | D | E | F | G |
|---|---|---|---|---|
| r1 | −6.07763E−15 | 5.10934E−18 | −2.58504E−21 | 5.88571E−25 |
| r3 | −2.22195E−16 | 0 | 0 | 0 |

(C) Value of conditions

| (1) | −0.35 |
|---|---|
| (2) | −0.51 |
| (3) | −0.025 |

Various values

| φ1 | −0.0223 |
|---|---|
| φb | −0.0153 |
| φw | 0.0440 |
| φb r1 | −0.0011 |

TABLE 2

(Numerical example 2)

(A) lens configuration

| | Wide | Tele |
|---|---|---|
| f | 22.77 | 39.97 |
| F | 2.10 | 2.40 |
| Field angle | 30.6 | 18.7 |
| Total lens length | 215.9 | |
| BF | 72.5 | |

Zoom ratio 1.75

| | | | |
|---|---|---|---|
| * r1 = 255.02 | d1 = 3.00 | n1 = 1.516 | v1 = 64.1 |
| r2 = 55.77 | d2 = 10.30 | | |
| * r3 = 45.37 | d3 = 3.00 | n2 = 1.773 | v2 = 49.6 |
| r4 = 32.88 | d4 = 12.15 | | |
| r5 = −319.16 | d5 = 2.10 | n3 = 1.497 | v3 = 81.5 |
| r6 = 65.97 | d6 = 10.31 | | |
| r7 = −47.03 | d7 = 2.28 | n4 = 1.497 | v4 = 81.5 |
| r8 = 275.87 | d8 = 2.00 | | |
| r9 = 175.41 | d9 = 8.16 | n5 = 1.694 | v5 = 50.8 |
| r10 = −72.12 | d10 = variable | | |
| r11 = 94.46 | d11 = 5.55 | n6 = 1.678 | v6 = 55.3 |
| r12 = −148.49 | d12 = variable | | |
| r13 = 54.66 | d13 = 6.07 | n7 = 1.717 | v7 = 29.5 |
| r14 = −173.05 | d14 = 1.85 | n8 = 1.805 | v8 = 25.5 |
| r15 = 117.44 | d15 = variable | | |
| r16 = −526.52 | d16 = 1.60 | n9 = 1.717 | v9 = 47.9 |

TABLE 2-continued (Numerical example 2)

| | | | |
|---|---|---|---|
| r17 = 49.97 | d17 = variable | | |
| ST r18 = ∞ | d18 = 6.64 | | |
| r19 = −38.83 | d19 = 1.60 | n10 = 1.606 | v10 = 43.7 |
| r20 = −542.98 | d20 = 0.75 | | |
| r21 = 104.57 | d21 = 5.21 | n11 = 1.808 | v11 = 22.8 |
| r22 = −63.00 | d22 = 4.53 | | |
| r23 = −198.98 | d23 = 1.80 | n12 = 1.855 | v12 = 24.8 |
| r24 = 57.28 | d24 = 7.00 | n13 = 1.516 | v13 = 64.1 |
| r25 = −62.74 | d25 = 1.00 | | |
| r26 = 802.63 | d26 = 8.31 | n14 = 1.607 | v14 = 56.8 |
| r27 = −30.76 | d27 = 1.90 | n15 = 1.855 | v15 = 24.8 |
| r28 = −114.89 | d28 = variable | | |
| r29 = 146.00 | d29 = 7.93 | n16 = 1.439 | v16 = 94.7 |
| r30 = −51.65 | d30 = 2.23 | | |
| r31 = −48.32 | d31 = 2.10 | n17 = 1.673 | v17 = 38.2 |
| r32 = −68.84 | d32 = variable | | |
| r33 = 71.08 | d33 = 4.85 | n18 = 1.946 | v18 = 18.0 |
| r34 = 164.91 | d34 = 4.50 | | |
| r35 = ∞ | d35 = 38.70 | n19 = 1.516 | v19 = 64.0 |
| r36 = ∞ | d36 = 19.50 | n20 = 1.841 | v20 = 25.0 |
| r37 = ∞ | d37 = 9.78 | | |

Zoom (2050 mm)

| Unit distance | Wide | Tele |
|---|---|---|
| d10 | 32.15 | 8.34 |
| d12 | 2.53 | 19.45 |
| d15 | 4.77 | 13.36 |
| d17 | 43.25 | 5.80 |
| d28 | 2.00 | 15.15 |
| d32 | 6.92 | 29.52 |

(B) Aspheric coefficients

| | K | A | B | C |
|---|---|---|---|---|
| r1 | 0 | 5.01208E−06 | −3.99825E−09 | 5.43485E−12 |
| r3 | 0 | −3.51212E−06 | 7.77602E−10 | −6.43592E−13 |

| | D | E | F | G |
|---|---|---|---|---|
| r1 | −6.44043E−15 | 5.55687E−18 | −2.76239E−21 | 5.91806E−25 |
| r3 | −1.42976E−16 | 0 | 0 | 0 |

(C) Value of conditions

| | |
|---|---|
| (1) | −0.36 |
| (2) | −0.44 |
| (3) | −0.025 |

Various values

| | |
|---|---|
| φ1 | −0.0195 |
| φb | −0.0158 |
| φw | 0.0439 |
| φb r1 | −0.0011 |

TABLE 3

(Numerical example 3)

(A) lens configuration

| | Wide | Tele |
|---|---|---|
| f | 22.71 | 39.97 |
| F | 2.40 | 2.40 |
| Field angle | 30.7 | 18.7 |
| Total lens length | 220.0 | |
| BF | 74.1 | |

Zoom ratio 1.76

| | | | |
|---|---|---|---|
| * r1 = 155.38 | d1 = 2.45 | n1 = 1.516 | v1 = 64.14 |
| r2 = 38.11 | d2 = 9.36 | | |

TABLE 3-continued (Numerical example 3)

| | | | |
|---|---|---|---|
| * r3 = 71.96 | d3 = 2.40 | n2 = 1.773 | v2 = 49.60 |
| r4 = 42.69 | d4 = 9.24 | | |
| r5 = −331.77 | d5 = 2.00 | n3 = 1.497 | v3 = 81.54 |
| r6 = 89.77 | d6 = 13.26 | | |
| r7 = −46.70 | d7 = 3.00 | n4 = 1.497 | v4 = 81.54 |
| r8 = −298.55 | d8 = 3.79 | | |
| r9 = 423.34 | d9 = 8.33 | n5 = 1.694 | v5 = 50.81 |
| r10 = −59.29 | d10 = variable | | |
| r11 = 78.23 | d11 = 5.78 | n6 = 1.678 | v6 = 55.34 |
| r12 = −462.24 | d12 = variable | | |
| r13 = 48.97 | d13 = 6.60 | n7 = 1.717 | v7 = 29.52 |
| r14 = −89.87 | d14 = 1.90 | n8 = 1.805 | v8 = 25.46 |
| r15 = 67.11 | d15 = variable | | |
| r16 = 161.42 | d16 = 1.80 | n9 = 1.717 | v9 = 47.93 |
| r17 = 42.26 | d17 = variable | | |
| ST r18 = ∞ | d18 = variable | | |
| r19 = −44.03 | d19 = 1.80 | n10 = 1.606 | v10 = 43.71 |
| r20 = −131.54 | d20 = 1.00 | | |
| r21 = 183.30 | d21 = 4.15 | n11 = 1.808 | v11 = 22.76 |
| r22 = −66.30 | d22 = variable | | |
| r23 = −499.69 | d23 = 1.80 | n12 = 1.855 | v12 = 24.80 |
| r24 = 58.38 | d24 = 5.41 | n13 = 1.516 | v13 = 64.14 |
| r25 = −83.92 | d25 = 0.75 | | |
| r26 = −569.37 | d26 = 5.84 | n14 = 1.607 | v14 = 56.82 |
| r27 = −32.52 | d27 = 1.93 | n15 = 1.855 | v15 = 24.80 |
| r28 = −135.34 | d28 = variable | | |
| r29 = 142.74 | d29 = 9.56 | n16 = 1.439 | v16 = 94.66 |
| r30 = −46.02 | d30 = 2.00 | | |
| r31 = −45.83 | d31 = 2.30 | n17 = 1.673 | v17 = 38.15 |
| r32 = −63.50 | d32 = variable | | |
| r33 = 81.22 | d33 = 3.56 | n18 = 1.946 | v18 = 18.0 |
| r34 = 203.31 | d34 = 4.50 | | |
| r35 = ∞ | d35 = 38.70 | n19 = 1.516 | v19 = 64.0 |
| r36 = ∞ | d36 = 19.50 | n20 = 1.841 | v20 = 25.0 |
| r37 = ∞ | d37 = 11.42 | | |

Zoom (2050 mm)

| Unit distance | Wide | Tele |
|---|---|---|
| d10 | 48.28 | 3.60 |
| d12 | 1.50 | 33.91 |
| d15 | 2.99 | 13.04 |
| d17 | 38.79 | 2.96 |
| d18 | 2.91 | 13.32 |
| d22 | 13.02 | 0.50 |
| d28 | 0.50 | 25.70 |
| d32 | 2.00 | 16.96 |

(B) Aspheric coefficients

| | K | A | B | C |
|---|---|---|---|---|
| r1 | 0 | 5.62775E−06 | −3.46421E−09 | 5.04723E−12 |
| r3 | 0 | −3.87324E−06 | 1.90376E−10 | 7.15252E−13 |

| | D | E | F | G |
|---|---|---|---|---|
| r1 | −6.63877E−15 | 8.32186E−18 | −6.41230E−21 | 2.40865E−24 |
| r3 | −1.37458E−15 | 0 | 0 | 0 |

(C) Value of conditions

| | |
|---|---|
| (1) | −0.28 |
| (2) | −0.32 |
| (3) | 0.101 |

Various values

| | |
|---|---|
| φ1 | −0.0143 |
| φb | −0.0125 |
| φw | 0.0440 |
| φb r1 | 0.0044 |

TABLE 4

(Numerical example 4)

(A) lens configuration

|   | Wide | Tele |
|---|---|---|
| f | 22.77 | 40.08 |
| F | 2.10 | 2.40 |
| Field angle | 30.7 | 18.6 |
| Total lens length | 220.0 | |
| BF | 72.5 | |

Zoom ratio 1.76

|   |   |   |   |   |
|---|---|---|---|---|
| * | r1 = 270.00 | d1 = 3.00 | n1 = 1.516 | v1 = 64.1 |
|   | r2 = 65.71 | d2 = 8.95 | | |
| * | r3 = 51.69 | d3 = 3.00 | n2 = 1.773 | v2 = 49.6 |
|   | r4 = 32.69 | d4 = 19.44 | | |
|   | r5 = −137.73 | d5 = 2.10 | n3 = 1.497 | v3 = 81.5 |
|   | r6 = 76.64 | d6 = 10.15 | | |
|   | r7 = −41.61 | d7 = 2.50 | n4 = 1.497 | v4 = 81.5 |
|   | r8 = 5364.30 | d8 = 2.01 | | |
|   | r9 = 551.53 | d9 = 6.82 | n5 = 1.694 | v5 = 50.8 |
|   | r10 = −59.65 | d10 = variable | | |
|   | r11 = 83.38 | d11 = 5.66 | n6 = 1.678 | v6 = 55.3 |
|   | r12 = −158.45 | d12 = variable | | |
|   | r13 = 62.98 | d13 = 5.86 | n7 = 1.717 | v7 = 29.5 |
|   | r14 = −116.65 | d14 = 1.80 | n8 = 1.805 | v8 = 25.5 |
|   | r15 = 183.86 | d15 = variable | | |
|   | r16 = −1326.11 | d16 = 1.60 | n9 = 1.717 | v9 = 47.9 |
|   | r17 = 49.68 | d17 = variable | | |
| ST | r18 = ∞ | d18 = 7.20 | | |
|   | r19 = −34.37 | d19 = 1.60 | n10 = 1.606 | v10 = 43.7 |
|   | r20 = −202.07 | d20 = 0.75 | | |
|   | r21 = 104.10 | d21 = 5.52 | n11 = 1.808 | v11 = 22.8 |
|   | r22 = −64.11 | d22 = variable | | |
|   | r23 = −178.62 | d23 = 1.80 | n12 = 1.855 | v12 = 24.8 |
|   | r24 = 63.04 | d24 = 7.28 | n13 = 1.516 | v13 = 64.1 |
|   | r25 = −60.47 | d25 = 1.00 | | |
|   | r26 = −1070.42 | d26 = 8.82 | n14 = 1.607 | v14 = 56.8 |
|   | r27 = −29.08 | d27 = 2.00 | n15 = 1.855 | v15 = 24.8 |
|   | r28 = −82.75 | d28 = variable | | |
|   | r29 = 138.88 | d29 = 9.80 | n16 = 1.439 | v16 = 94.7 |
|   | r30 = −43.51 | d30 = 2.00 | | |
|   | r31 = −42.67 | d31 = 2.28 | n17 = 1.673 | v17 = 38.2 |
|   | r32 = −83.96 | d32 = variable | | |
|   | r33 = 82.59 | d33 = 3.87 | n18 = 1.946 | v18 = 18.0 |
|   | r34 = 269.97 | d34 = 4.50 | | |
|   | r35 = ∞ | d35 = 38.70 | n19 = 1.516 | v19 = 64.0 |
|   | r36 = ∞ | d36 = 19.50 | n20 = 1.841 | v20 = 25.0 |
|   | r37 = ∞ | d37 = 9.78 | | |

Zoom (2050 mm)

| Unit distance | Wide | Tele |
|---|---|---|
| d10 | 21.16 | 0.74 |
| d12 | 2.50 | 17.14 |
| d15 | 3.82 | 16.00 |
| d17 | 45.65 | 6.91 |
| d22 | 5.90 | 2.00 |
| d28 | 5.85 | 16.73 |
| d32 | 8.31 | 31.29 |

(B) Aspheric coefficients

|   | K | A | B | C |
|---|---|---|---|---|
| r1 | 0 | 5.12776E−06 | −3.97730E−09 | 5.40631E−12 |
| r3 | 0 | −3.60180E−06 | 1.12759E−09 | −6.39085E−13 |

|   | D | E | F | G |
|---|---|---|---|---|
| r1 | −6.38862E−15 | 5.55757E−18 | −2.79710E−21 | 6.12521E−25 |
| r3 | −2.79119E−17 | 0 | 0 | 0 |

(C) Value of conditions

| (1) | −0.34 |
|---|---|
| (2) | −0.51 |
| (3) | −0.025 |

Various values

| $\varphi 1$ | −0.0224 |
|---|---|
| $\varphi b$ | −0.0150 |
| $\varphi w$ | 0.0439 |
| $\varphi b\ r1$ | −0.0011 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-132431, filed on Jul. 6, 2017, which is hereby incorporated by reference herein in its entirety.

What is claimed is:

1. A zoom lens comprising:
   a stop;
   at least three front side movable lens units that are disposed on an enlargement conjugate side further than the stop and that are movable for variation of magnification; and
   a front side fixed lens unit that is disposed on the enlargement conjugate side further than the at least three front side movable lens units and that is fixed for the variation of magnification, wherein the at least three front side movable lens units include:
   two movable lens units as first front side movable lens units that are movable to the enlargement conjugate side for variation of magnification from a wide-angle end to a telephoto end; and
   one movable lens unit as a second front side movable lens unit that is disposed on the reduction conjugate side further than the first front side movable lens units and that is movable to the reduction conjugate side for the variation of magnification from the wide-angle end to the telephoto end.

2. The zoom lens according to claim 1, wherein the zoom lens includes at least two rear side movable lens units that are disposed on the reduction conjugate side further than the stop and that are movable for the variation of magnification.

3. The zoom lens according to claim 1, wherein the at least three front side movable lens units include at least one cemented lens.

4. The zoom lens according to claim 1, wherein the at least three front side movable lens units are three lens units.

5. The zoom lens according to claim 1, wherein the following condition is satisfied:

$$-0.6 \leq \varphi b/\varphi w < 0$$

where $\varphi w$ represents a refractive power of the entire zoom lens at the wide-angle end, and $\varphi b$ represents a refractive power of the second front side movable lens unit.

6. The zoom lens according to claim 1, wherein the following condition is satisfied:

$$-0.7 \leq \varphi 1/\varphi w \leq -0.1$$

where $\varphi w$ represents a refractive power of the entire zoom lens at the wide-angle end, and $\varphi 1$ represents a negative refractive power of the front side fixed lens unit.

7. The zoom lens according to claim 1, wherein the following condition is satisfied:

$$-0.2 \leq \varphi br1/\varphi w \leq 0.3$$

where φw represents a refractive power of the entire zoom lens at the wide-angle end, and φbr1 represents a refractive power of an enlargement conjugate side lens surface of a most-reduction conjugate side lens of the second front side movable lens unit.

8. An image projection apparatus comprising:

a light modulation element configured to modulate light from a light source; and a zoom lens, wherein the zoom lens comprising:

a stop;

at least three front side movable lens units that are disposed on an enlargement conjugate side further than the stop and are movable for variation of magnification; and a front side fixed lens unit that is disposed on the enlargement conjugate side further than the at least three front side movable lens units and that is fixed for the variation of magnification, wherein the at least three front side movable lens units include:

two movable lens units as first front side movable lens units that are movable to the enlargement conjugate side for variation of magnification from a wide-angle end to a telephoto end; and one movable lens unit as a second front side movable lens unit that is disposed on the reduction conjugate side further than the first front side movable lens units and that is movable to the reduction conjugate side for the variation of magnification from the wide-angle end to the telephoto end.

\* \* \* \* \*